United States Patent [19]
Männl et al.

[11] Patent Number: 5,178,401
[45] Date of Patent: Jan. 12, 1993

[54] ROTATABLE CHUCK FOR GLASS TUBES

[75] Inventors: Reinhard Männl, Mitterteich; Alfons Wolfrum, Tirschenreuth; Franz Neumeier, Arzberg, all of Fed. Rep. of Germany

[73] Assignee: Schott Glaswerke, Mainz, Fed. Rep. of Germany

[21] Appl. No.: 738,647

[22] Filed: Jul. 31, 1991

[30] Foreign Application Priority Data

Jul. 31, 1990 [DE] Fed. Rep. of Germany ....... 4024498

[51] Int. Cl.[5] .......................... C03B 23/11; B23B 31/30
[52] U.S. Cl. ..................................... 279/4.04; 65/278; 279/4.12; 279/121; 279/157
[58] Field of Search ............................. 65/278–280, 65/272; 279/4.04, 4.12, 121, 110, 157

[56] References Cited

U.S. PATENT DOCUMENTS

| | | | |
|---|---|---|---|
| 1,621,359 | 3/1927 | Fagan et al. | 65/279 |
| 3,227,539 | 1/1966 | Bekkering et al. | 65/280 X |
| 4,111,677 | 9/1978 | Andrews | 65/280 X |
| 4,832,726 | 5/1989 | Dichter | 65/280 X |
| 5,017,208 | 5/1991 | Gregory et al. | 65/279 X |

*Primary Examiner*—Steven C. Bishop
*Attorney, Agent, or Firm*—Millen, White, Zelano and Branigan

[57] ABSTRACT

Chucks for glass tubes should be designed so that, on the one hand, they grasp the glass tube gently so that the tube is not destroyed, and, on the other hand, so that they hold it securely enough so that a proper processing of the glass tube is possible. This causes a degree of technical complexity which enlarges the dimensions of the chuck and leads to a narrow diameter range for the clampable glass tubes. For other diameter ranges, the chucks have to be changed. The chuck according to the invention has a wide diameter range with small outside dimensions. The chuck has clamping jaws which can be moved radially with respect to its longitudinal axis and has a distance from the longitudinal axis determined by a pressure sleeve, which is connected to the clamping jaws by a forced guidance device. The forced guidance forms an angle of 30° to 60°, and preferably 45°, with respect to the longitudinal axis. The chuck is used to hold glass tubes in a machine for producing vials.

11 Claims, 2 Drawing Sheets

ROTATABLE CHUCK FOR GLASS TUBES

BACKGROUND OF THE INVENTION

The invention relates to a rotatable chuck for glass tubes, especially for machines for the production of vials or ampules made from glass tubes.

A vial machine, in which vials or ampules are produced from glass tubes by rolling, utilizes rotatable chucks spaced at regular intervals and usually carried on a turntable, from which glass tubes are successively fed to various processing stations. The chucks are rotatable, so that axially symmetrical shaping of the vial is possible. The shaping steps performed are in this case normally rolling of a mouth area and smoothing of the bottom on the vial. Since shaping of the glass tube is possible only at elevated temperatures (550°-1,000° C.), the chucks have to operate reliably even at comparatively high temperatures. On the other hand, gentle grasping and holding must be possible with the chuck so that the glass tube held by the chuck is not destroyed.

A chuck of the above-described type is known from U.S. Pat. No. 4,832,726. This chuck described exhibits three clamping jaws, placed at regular spacing intervals around a tube, which jaws are guided in inclined guides. The ends of the clamping jaws facing away from the glass tube to be held each include a ball bearing, which in every case is guided in a thrust ring. A spring acts on the thrust rings, so that the clamping jaws in the inclined guides are moved at an acute angle in the direction of the longitudinal axis of the glass tube. The thrust ring is retractable against the spring pressure by an actuating lever, by which lever the clamping jaws guided by the ball bearing in the thrust ring are retracted from the glass tube. This chuck has a comparatively large linear extension and can securely grasp glass tubes only within a certain diameter range. If glass tubes of another diameter range are used in these chucks, they have to be changed, i.e., other clamping jaws and/or another spring are used in the chuck.

For this purpose, it is necessary to provide for various clamping jaws and/or springs, and further, an additional expenditure of time is added because of the changeover.

SUMMARY OF THE INVENTION

The object of the invention is to make available a chuck that can securely hold glass tubes in a wide diameter range without change. Also, the dimensions of the chuck are to be comparatively small, so that the chuck does not require too much space in a vial machine.

According to this invention, the clamping jaws are no longer moved in an inclined guide but basically extend perpendicular to the longitudinal axis of the tube. This results in the advantage that the clamping jaws when grasping are now free of a lengthwise movement and thus the glass tube can be grasped securely, without in the case moving slightly in the lengthwise direction. Another advantage of this movement is that the clamping jaws require little space in the lengthwise direction of the tube, and therefore it is feasible for the chuck to be smaller than as described in the prior art.

The chuck preferably has three clamping jaws, making secure and centered grasping of glass tubes possible.

An embodiment of the chuck is also advantageous in which a pressure sleeve rotates together with the chuck and, corresponding to the transmission of the necessary holding force to the clamping jaws, provides a continuous groove as a guide for at least one guide roller of the stationary actuating element relative to the rotation of the tube. In another embodiment, the continuous groove is replaced by one, or preferably two, thrust bearings, on which the actuating element directly acts without interposition of a guide roller and thus provides for the opening and closing of the chuck.

It is also advantageous in the chuck according to the invention that the pressure sleeve and the clamping jaws are connected with one another by forced guidance at an angle of 30° to 60° relative to the tube axis, since in this way with simple means, a secure movement of the clamping jaws perpendicular to the lengthwise axis of the glass tube is possible. It has been shown that a forced guidance at an angle of 45° is most advantageous and saves the most space. Preferably, the forced guidance is accomplished by a link guide and a driver guided therein. Advantageously, the link guide is placed in the pressure sleeve and the driver is placed in each of the clamping jaws. Such an arrangement is safe to operate and simple to manufacture.

Further, a pneumatic movement of the pressure sleeve is also favorable, since such a movement, in contrast to a spring tension adjustment, exhibits no characteristic which necessitates varying adjustment forces and further can be operated without force in every position. This removes the need for an operating lever for the thrust ring and a corresponding cam. Further, the holding force, acting on the glass tube, of the clamping jaws can also be adjusted during operation, which was not possible with the previous chucks. If the glass tube in the chuck slipped in the case of a chuck of the prior art, the entire carousel had to be stopped to readjust the chuck. In the pneumatic operation according to this invention, such a readjustment can also take place during the operation of the vial machine.

The chuck according to the invention can also be equipped with other operating means for the clamping jaws. Thus, e.g., a hydraulic operation or also an operation by spring tension is possible, and then preferably an adjustable spring is used. But the pneumatic control has proven most advantageous—as described above—since in this way, with simple means, a firmer or a looser grasping of the glass tube is possible. This is especially advantageous in a vial machine, since the chuck holds the glass tube near its end, and the end represents the weakest point of the glass tube and is also heated. In the chucks of the prior art, a destruction of the tube end in this case was easily possible by too high a pressure.

To transmit a movement of rotation, the chuck exhibits a power transmission element, which, e.g., can be a sprocket or a gear, most suitably on its end opposite the clamping jaws. In a vial machine, then, the chucks are all connected with one another, e.g., by a chain or a gear unit, so that all chucks rotate in the same direction and at the same speed.

According to this invention, chucks can be made for glass tubes with an outside diameter of 13-50 mm, while because of the specified dimensions of a vial machine, in which the chuck is used, with the chucks of the prior art only a clamping range to about 35 mm or from 30 to about 50 mm is possible without change. The clamping range of 13-50 mm of the chuck according to the invention represents a preferred range, since practically all glass tubes used to make vials in vial machines are in this range. If desired, another clamping range can also be attained by another dimensioning of the chuck.

BRIEF DESCRIPTION OF THE DRAWINGS

An embodiment of the invention is represented in the drawings and is described in more detail below.

There are shown in.

DETAILED DESCRIPTION

Figure 1:
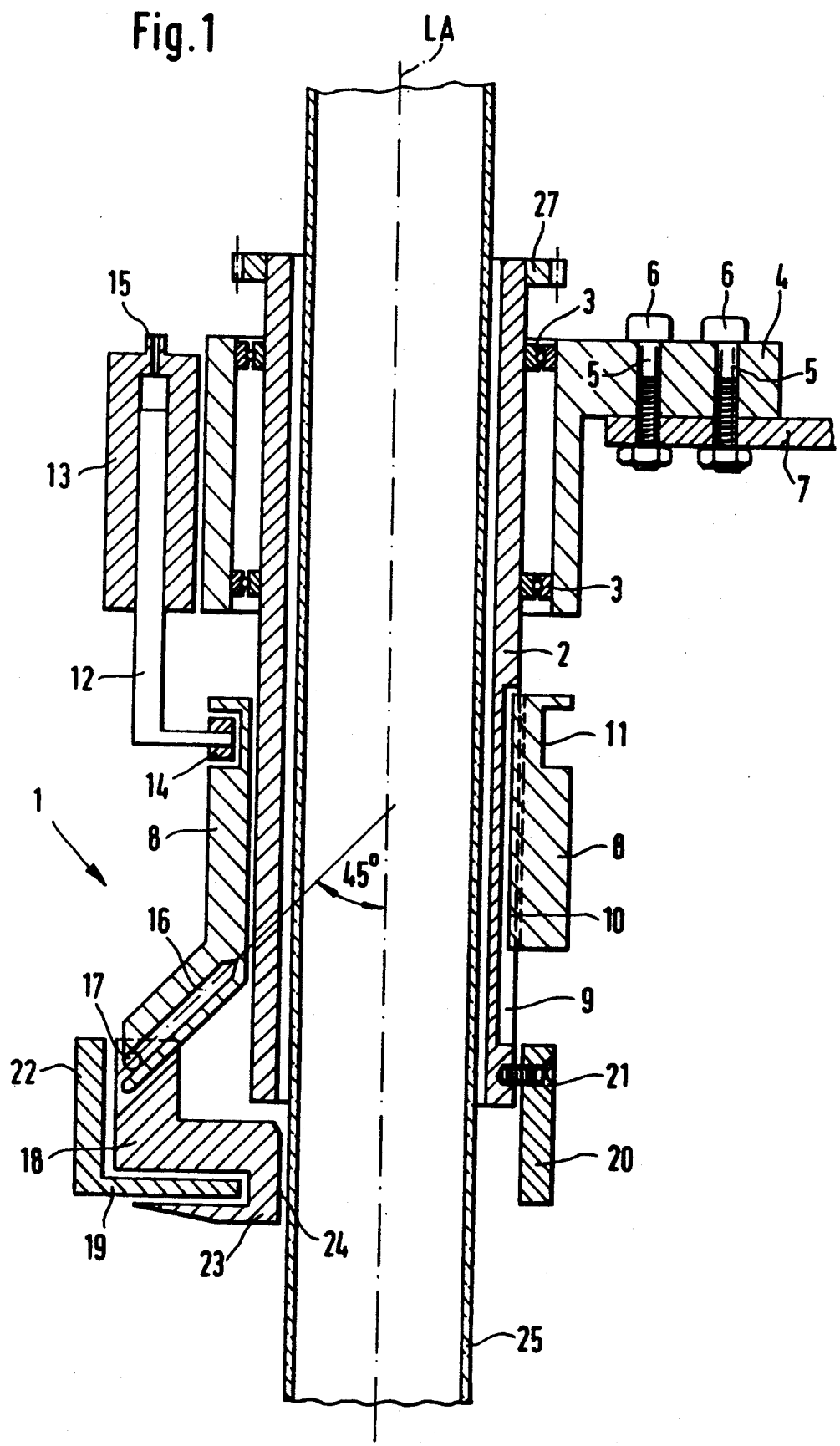
FIG. 1, a longitudinal section through a chuck.

As represented in FIG. 1, chuck 1 has as a primary structure tube 2, which is carried at its upper area by a bearing 3 of a stationary holding device 4, which can be fastened through bores 5 by fasteners 6 (e.g., bolts) to a platform 7 of a carousel (not shown) of a vial machine. Holding device 4 can also be integral with platform 7 or can be connected to the platform in another way, e.g., by welding. A gear 27 is fixed to the upper end of the tube, by which tube 2 is rotatable relative to platform 7.

A pressure sleeve 8, which is movable in the lengthwise direction on tube 2, is located on the outside of tube 2 proximate its lower end, and is connected in a torsion-resistant way to the tube by a key 10, which engages in a groove 9 of tube 2. Pressure sleeve 8 has a continuous guide groove 11 at its upper end for an actuating element 12, which is located with one of its ends in a pneumatic cylinder 13 and exhibits at its other end a guide roller 14, which, if tube 2 is in a movement of rotation around its longitudinal axis, rolls in guide groove 11. Pneumatic cylinder 13 is fastened to stationary holding device 4 and includes a connection 15, by which pneumatic cylinder 13 is connected to a pneumatic system (not shown) for moving actuating element 12.

At its lower end, pressure sleeve 8 includes three link guides 16 offset relative to one another by 120° in each case (only one is represented) which is extended at an angle of 45° to longitudinal axis LA of the chuck or tube 2. A driver pin 17 of a clamping jaw 18 is guided in each of the link guides 16. In addition, clamping jaws 18 are also located in jaw guides 19, which run basically perpendicular to longitudinal axis LA. As a result, a movement of clamping jaws 18 is possible only perpendicular to longitudinal axis LA.

Jaw guides 19 are part of a jaw holding device 20, which is connected permanently to tube 2 by a fastener 21. In addition, jaw holding device 20 includes a shield 22, which protects link guide 16 from a fouling by, e.g., splinters of glass. Shield 22 is extended over the areas at the back and the sides of clamping jaw 18.

Figure 2:
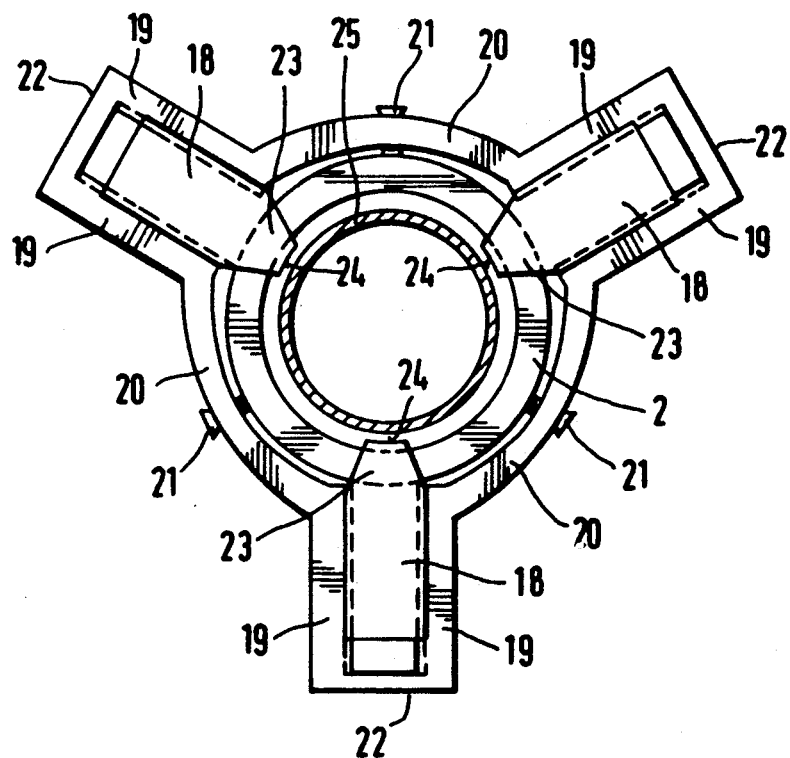
FIG. 2, a top view of a chuck from the clamping jaw side.

In FIG. 2, clamping jaws 18 and jaw holding device 20 can be seen with jaw guides 19 in another perspective. Clamping jaws 18 are placed at an angle of 120° to one another around tube 2 and are guided outside in two each of jaw guides 19. In their clamping range 23, clamping jaws 18 are somewhat tapered, so that they are not obstructed when pushed in the direction of longitudinal axis LA. Clamping range 23 exhibits a front surface 24, which is suitable to hold a glass tube 25 by nonpositive squeezing in chuck 1.

Here also, jaw holding device 20, which forms shields 22 and jaw guides 19 in the area of clamping jaws 18, can clearly be seen.

Figure 3:
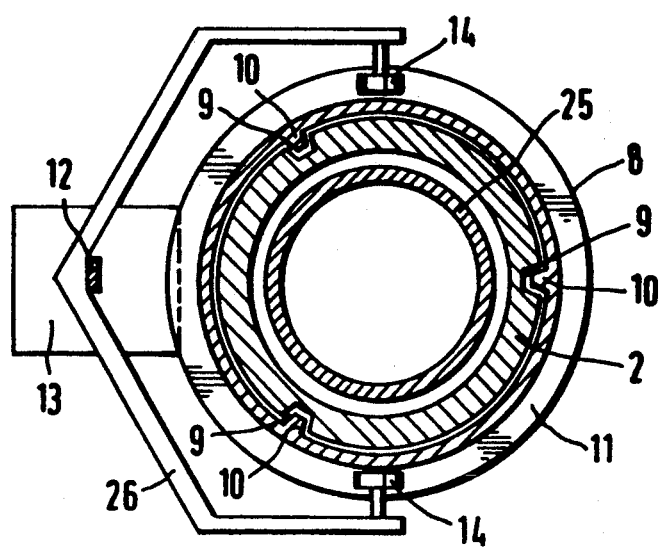
FIG. 3, a cross section through the chuck.

Another possibility for operating pressure sleeve 8 is represented in FIG. 3. Unlike in FIG. 1, actuating element 12 does not act here directly by a guide roller 14 on guide groove 9 of pressure sleeve 8 but on a yoke 26, which carries two guide rollers 14, offset by 180°, placed in guide groove 9, by which a more secure movement of pressure sleeve 8 is assured. In FIG. 3, the arrangement of grooves 9 in tube 2 and of wedges 10 in pressure sleeve 8 can be clearly seen.

To introduce glass tube 25 in chuck 1, the chuck is opened by pushing back clamping jaws 18. For this purpose, the pneumatic fluid, preferably air, is drained or pumped out from pneumatic cylinder 13 through connection 15, by which actuating element 12 is drawn into pneumatic cylinder 13 and retracts pressure sleeve 8 by guide roller(s) 14. In this way, driver pin 17, connected permanently to clamping jaw 18, which preferably is designed as a roller, reaches the outer end of link guide 16, since only a movement of clamping jaws 18 and thus driver pin 17 only in a direction perpendicular to longitudinal axis LA and not parallel to the latter is possible by jaw guides 19.

Glass tube 25, which can have a diameter in the clamping range of the chuck, can now be inserted in chuck 1 thus opened. This insertion of glass tube 12 normally takes place from the upper end of tube 2, since the processing of the glass tube normally takes place on the part showing from the lower end of the chuck. As soon as glass tube 25 is in a desired insertion depth, it is held for processing by clamping jaws 18. For this purpose, the pneumatic fluid is again introduced in pneumatic cylinder 13 by connection 15, so that actuating element 12 is pushed out from the latter. Again, the latter acts by guide roller(s) 14 on pressure sleeve 8 and moves it downward in the direction of clamping jaws 18. In this case, they are moved by link guide 16 along jaw guide 19 in the direction of longitudinal axis LA until they securely hold glass tube 25. In this case, by the pressure of the pneumatic fluid, the holding force can be matched to the respective requirements also during the operation of the vial machine.

Unlike what has been represented, a spring (not shown) can be provided which pushes back actuating element 12 or pressure sleeve 8 so that clamping jaws 18 are opened in a pressureless state of pneumatic cylinder 13. As a result, an opening of chuck 1 is possible only by making connection 15 of pneumatic cylinder 13 pressureless, so that no means to actuate pneumatic cylinder 13 with partial vacuum is necessary.

The chuck according to the invention is operable in every position, so that, also unlike what has been represented, clamping jaws 18, e.g., can be directed upward. The chuck can also be designed so that tube 2 has a closed bottom and a glass tube piece is placed in the chuck from the clamping jaw side and also is again removed from this side. If a glass tube piece with a flat edge to the bottom of the tube 2 is used in such an embodiment, the inner space of the glass tube piece can be acted on with excess pressure through an opening contained in the bottom of the tube, which is especially advantageous in the formation of the bottom of a vial.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosure of all applications, patents and publications, cited above and below, and of corresponding German application P 40 24 498.9-45, are hereby incorporated by reference.

What is claimed is:

1. A rotatable chuck useful for clamping a glass tube in a machine for the production of vials or ampules made from glass tubes, wherein the machine includes a stationary holding device, in which a tube is rotatably mounted and on an end of which clamping jaws are placed, with the distance from the longitudinal axis of the tube being adjustable, the machine further including a pressure sleeve movably placed outside the tube, by operation of which the distance of the clamping jaws from the longitudinal axis of the tube is determined, the pressure sleeve including a guide for a stationary actuating element for movement along the tube, wherein the chuck includes jaw guides (19) placed on the tube end, the jaw guides including means for restraining the clamping jaws (18) for movement substantially perpendicular to the longitudinal axis (LA) of tube (2) and the restraining means including means for connecting (16, 17) the clamping jaws (18) and pressure sleeve (8) at an angle of 30° to 60° relative to longitudinal axis (LA) of tube (s).

2. The chuck according to claim 1, wherein three clamping jaws (18) are provided.

3. The chuck according to claim 1, wherein pressure sleeve (8) is connected in a torsion-resistant way to tube (2).

4. The chuck according to claim 3, wherein the guide is a continuous guide groove (11), which actuating element (12) engages with at least one guide roller (14).

5. The chuck according to claim 3, wherein the guide includes two thrust bearings engaging actuating element (12).

6. The chuck according to claim 1, wherein the connecting means includes a link guide means (16) with a driver pin means (17) guided therein.

7. The chuck according to claim 6, wherein link guide means (16) are placed in a pressure sleeve (8) and the driver pin means (17) are placed on each of the clamping jaws (18).

8. The chuck according to claim 7, wherein the link guide (16) extends at an angle of 45° relative to the longitudinal axis of the tube (2).

9. The chuck according to claim 1, wherein actuating element (12) is pneumatically movable.

10. The chuck according to claim 1, wherein the other end of tube (2) includes a means (27) to transmit rotation of tube (2).

11. The chuck according to claim 1, wherein the pressure sleeve (8) is placed between clamping jaws (18) and holding device (4).

* * * * *